United States Patent
Mercure

(10) Patent No.: US 9,174,614 B2
(45) Date of Patent: Nov. 3, 2015

(54) SAFETY BRAKE SYSTEM FOR TRAILERS

(76) Inventor: Roger Mercure, Mascouche (CA)

(*) Notice: Subject to any disclaimer, the term of this patent is extended or adjusted under 35 U.S.C. 154(b) by 420 days.

(21) Appl. No.: 13/203,530

(22) PCT Filed: Feb. 26, 2010

(86) PCT No.: PCT/CA2010/000290
§ 371 (c)(1),
(2), (4) Date: Aug. 26, 2011

(87) PCT Pub. No.: WO2010/096934
PCT Pub. Date: Sep. 2, 2010

(65) Prior Publication Data
US 2011/0303502 A1 Dec. 15, 2011

Related U.S. Application Data

(60) Provisional application No. 61/155,565, filed on Feb. 26, 2009, provisional application No. 61/243,704, filed on Sep. 18, 2009.

(51) Int. Cl.
*F16D 65/14* (2006.01)
*B60T 7/20* (2006.01)
(Continued)

(52) U.S. Cl.
CPC . *B60T 7/20* (2013.01); *B60D 1/065* (2013.01); *B60D 1/242* (2013.01); *B60D 1/58* (2013.01); *B60T 13/04* (2013.01); *Y10T 29/49863* (2015.01)

(58) Field of Classification Search
CPC ......... B62D 53/062; B60T 7/20; B60D 1/242
USPC .......... 188/2 D, 3 R, 74, 76, 112 R, 115, 117, 188/134; 280/428, 432, 446.1, 504, 510, 280/511
See application file for complete search history.

(56) References Cited

U.S. PATENT DOCUMENTS 1,387,274 A * 8/1921 Killian ............................ 30/520
2,093,185 A 9/1937 Bieber
(Continued)

FOREIGN PATENT DOCUMENTS

| EP | 324990 A1 | 12/1988 |
| EP | 805082 A2 | 11/1997 |

(Continued)

OTHER PUBLICATIONS

Madison Power Systems Orscheln® Products; Trailer Parking Brake Systems; http://www.madisonpowersystems.com/1cables/02parking/trailerparkbrake.htm.
(Continued)

*Primary Examiner* — Robert A Siconolfi
*Assistant Examiner* — Mahbubur Rashid
(74) *Attorney, Agent, or Firm* — Norton Rose Fulbright Canada LLP

(57) ABSTRACT

A safety brake system for a trailer comprises a brake end, an actuation end and a biasing unit. The brake end comprises a brake unit adapted to be secured to a trailer and positioned to block at least one wheel of the trailer when actuated. The actuation end comprises a mount adapted to be secured to a front end of the trailer and a probe operatively supported by the mount for displacement with respect to the trailer. The probe is operatively connected to the brake unit for actuating same. The probe is displaceable between a hitching state in which the probe is adapted to contact the hitch of a vehicle, and a braking state in which the probe actuates the brake unit. The biasing unit biases the probe against the hitch of the trailer in the hitching state and toward the braking state, such that the brake unit is actuated when the hitch is separated from the trailer.

15 Claims, 11 Drawing Sheets

(51) Int. Cl.
*B60D 1/06* (2006.01)
*B60D 1/24* (2006.01)
*B60D 1/58* (2006.01)
*B60T 13/04* (2006.01)

(56) References Cited

U.S. PATENT DOCUMENTS

| | | | | |
|---|---|---|---|---|
| 2,221,929 | A | * | 11/1940 | Snider .................. 188/112 R |
| 2,399,746 | A | * | 5/1946 | Klaus et al. ............ 188/112 R |
| 2,562,008 | A | * | 7/1951 | Williams ................ 188/112 R |
| 2,887,183 | A | | 5/1959 | Ross |
| 2,960,194 | A | | 11/1960 | Stromberg |
| 3,323,619 | A | | 6/1967 | Lacy |
| 3,570,633 | A | | 3/1971 | Garnett |
| 3,666,060 | A | | 5/1972 | Schroter |
| 3,814,218 | A | | 6/1974 | Merz |
| 3,870,128 | A | | 3/1975 | Nicolay et al. |
| 3,921,766 | A | | 11/1975 | May |
| 4,223,766 | A | * | 9/1980 | Huetsch et al. .......... 188/112 R |
| 4,469,202 | A | | 9/1984 | Bradley |
| 5,390,768 | A | | 2/1995 | Borkowski |
| 5,443,131 | A | | 8/1995 | Bartlett |
| 2003/0201141 | A1 | | 10/2003 | Frye |

FOREIGN PATENT DOCUMENTS

| | | |
|---|---|---|
| EP | 1398233 | 3/2004 |
| GB | 2130346 A | 5/1984 |
| GB | 2267134 A | 11/1993 |
| JP | 09109873 | 4/1997 |
| JP | 2001260831 | 9/2001 |

OTHER PUBLICATIONS

National Trailer and Towing Association; Trailer Brake Requirements; http://www.ntta.co.uk/law/trailers/brakes.htm.

* cited by examiner

SAFETY BRAKE SYSTEM FOR TRAILERS

CROSS-REFERENCE TO RELATED APPLICATIONS

The present patent application is a 35 U.S.C. 371 national stage of International Patent Application No. PCT/CA2010/000290. The present patent application claims the benefit of U.S. Provisional Patent Applications No. 61/155,565, filed on Feb. 26, 2009, and No. 61/243,704, filed on Sep. 18, 2009, both incorporated herein by reference.

FIELD OF THE APPLICATION

The present application relates to trailers such as domestic trailers and, more particularly, to a safety brake system used when trailers are unhitched or accidentally detached from a vehicle to block the wheels of the trailer.

BACKGROUND OF THE ART

Large trailers, such as those used in the freight industries, are equipped with braking systems in order to ensure that the tractor and trailer combination has enough braking power to safely transit on roads. Some trailers are commonly equipped with air brakes that are actuated from the tractor, which air brakes automatically lock the wheels of the trailer when the latter is unhitched.

Smaller trailers, for instance domestic trailers or trailers used to tow recreational vehicles (e.g., boat, motorcycle, ATV, etc.), are seldom provided with a braking system in order to keep their costs low. Accordingly, the braking power is fully supplied by the vehicle towing the trailer. When the trailer is unhitched, random masses (e.g., log, plank, rock) are often wedged behind the wheels of the trailer so as to block movement of the trailer. This action of wedging is hazardous. Moreover, if the operator forgets to wedge a mass behind the wheels, the trailer might start moving if it is on a slope. With the inertia of the trailer and its contents, a moving trailer is hard to stop and may cause severe damages and/or injuries.

Also, some types of smaller trailers may have brake systems. The brake systems may operate with electric, pneumatic, hydraulic networks, among other possibilities. In most cases, the brake systems can only be actuated by actions from the vehicle towing the trailer.

SUMMARY OF THE APPLICATION

It is therefore an aim of the present application to provide a safety brake system for trailers that addresses issues associated with the prior art.

It is a further aim of the present application to provide a method for installing a safety brake system to a trailer of a vehicle.

Therefore, in accordance with a first embodiment of the present application, there is provided a safety brake system for a trailer comprising: a brake end comprising a brake unit adapted to be secured to a trailer and positioned to block at least one wheel of the trailer when actuated; an actuation end comprising: a mount adapted to be secured to a front end of the trailer; a probe operatively supported by the mount for displacement with respect to the trailer, the probe being operatively connected to the brake unit for actuating same, the probe being displaceable between a hitching state in which the probe is adapted to contact the hitch of a vehicle, and a braking state in which the probe actuates the brake unit; a biasing unit to bias the probe against the hitch of the trailer in the hitching state and toward the braking state, such that the brake unit is actuated when the hitch is separated from the trailer.

Further in accordance with the first embodiment, a lever connected to the probe is provided to manually displace the probe between the hitching state and the braking state.

Still further, in accordance with the first embodiment, the lever is connected to the mount by a pivot connection.

Still further, in accordance with the first embodiment, the lever is connected to the probe by a pin-and-groove joint.

Still further, in accordance with the first embodiment, a lock unit is provided to releasably secure at least one of the probe and the lever to lock the brake unit in the braking state.

Still further, in accordance with the first embodiment, a translational joint is provided between the probe and mount for the probe to move in translation along the mount.

Still further, in accordance with the first embodiment, the probe has a main body operatively supported on the mount rearward of the hitch coupler, and a probe end having a L-shape and having a portion positioned forward of the hitch coupler, with a movement from the hitching state to the braking state being in a rearward direction.

Still further, in accordance with the first embodiment, a point of weakness is provided in the probe end for selected deformation of the probe end.

Still further, in accordance with the first embodiment, the biasing unit is a spring connected between the probe and the mount.

Still further, in accordance with the first embodiment, a cable unit having a housing and wire is provided, the wire axially displaceable in the housing, with the cable unit connected to the probe at a first end and to the brake unit at another end to transmit actuation of the actuation end to the brake end.

Still further, in accordance with the first embodiment, a brake mount per wheel is provided, the brake mount being adapted to be connected to the trailer, and at least one arm pivotally connected to the brake mount, to pivot to a braking contact with a rim of the wheel.

Still further, in accordance with the first embodiment, the brake mount has two of said arms per wheel, with the two arms respectively providing braking contact to the rim for an own direction of rotation of the wheel.

Still further, in accordance with the first embodiment, the arms are biased away from one another by a spring.

Still further, in accordance with the first embodiment, the brake mount is adapted to be mounted to an axle of the trailer.

Still further, in accordance with the first embodiment, the brake unit is the existing brake unit of the trailer.

Still further, in accordance with the first embodiment, a breakable unit connecting the wire to the probe, and a link between the breakable unit and the vehicle are provided, to break the breakable unit by transmitting a separation force when the trailer is inadvertently detached from the vehicle with the hitch remains coupled to the hitch coupler, to actuate the brake unit through the wire.

Still further, in accordance with the first embodiment, a clearance between a braking end of the arm for one wheel is greater than that of a braking end of the arm for another wheel in the hitching state.

In accordance with a second embodiment of the present application, there is provided a method for installing a safety brake system to a trailer of a vehicle, comprising: securing a mount to a front end of the trailer, the mount operatively supporting a probe having a portion displaceable over an expected position of a hitch when the trailer is unhitched; connecting the probe to a brake unit of the trailer; biasing the probe to move to a braking state position in which the probe actuates the brake unit when the trailer is unhitched; and hitching the trailer to the vehicle such that the probe is retained from moving to the braking state position by the hitch of the vehicle.

Further in accordance with the second embodiment, the probe is connected by connecting the probe to an existing brake unit of the trailer.

Still further, in accordance with the second embodiment, the trailer is hitched by manually moving the probe away from the braking state position to allow the hitching.

Still further, in accordance with the second embodiment, the probe is manually moved away from the braking state position when the trailer is unhitched to release the brake unit.

Still further, in accordance with the second embodiment, a brake unit is installed to the trailer prior to connecting the probe to the brake unit.

DESCRIPTION OF THE PREFERRED EMBODIMENTS

Figure 1:
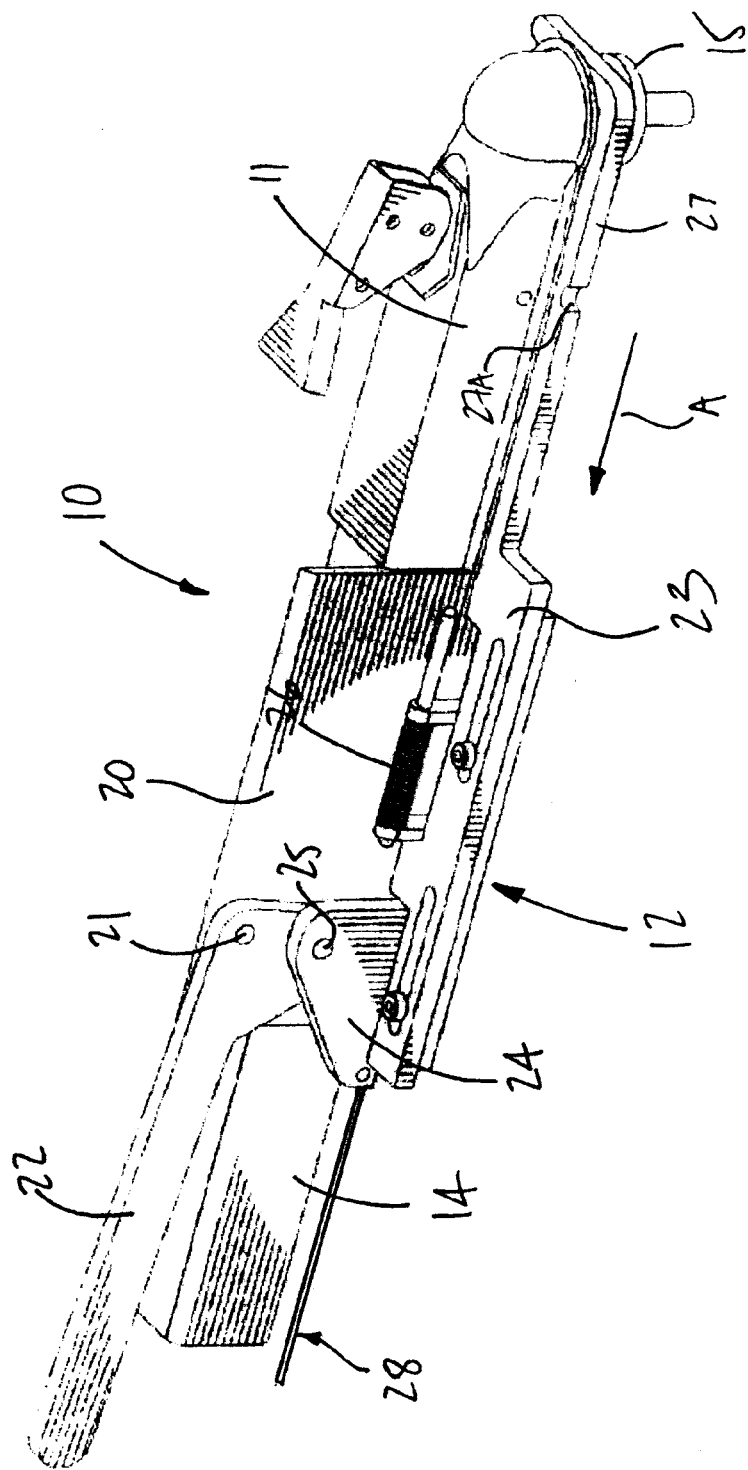
FIG. 1 is a top perspective view of an actuation end of a safety brake system in accordance with an embodiment of the present application, in a hitched state on a tongue of a trailer.

Referring to the drawings, and more particularly to FIGS. 1 to 4, a front end of a trailer is generally illustrated at 10, as equipped with a hitch coupler 11. An actuation end of the safety brake system of the present disclosure is illustrated at 12, whereas a brake end of the safety brake system is illustrated at 13 in FIGS. 5-8.

The trailer 10 is used to carry loads and is towed by a vehicle.

The actuation end 12 is used to actuate the brake system or wheel blocking system.

The brake end 13 performs the braking action to block the wheels of the trailer 10.

Figure 5:
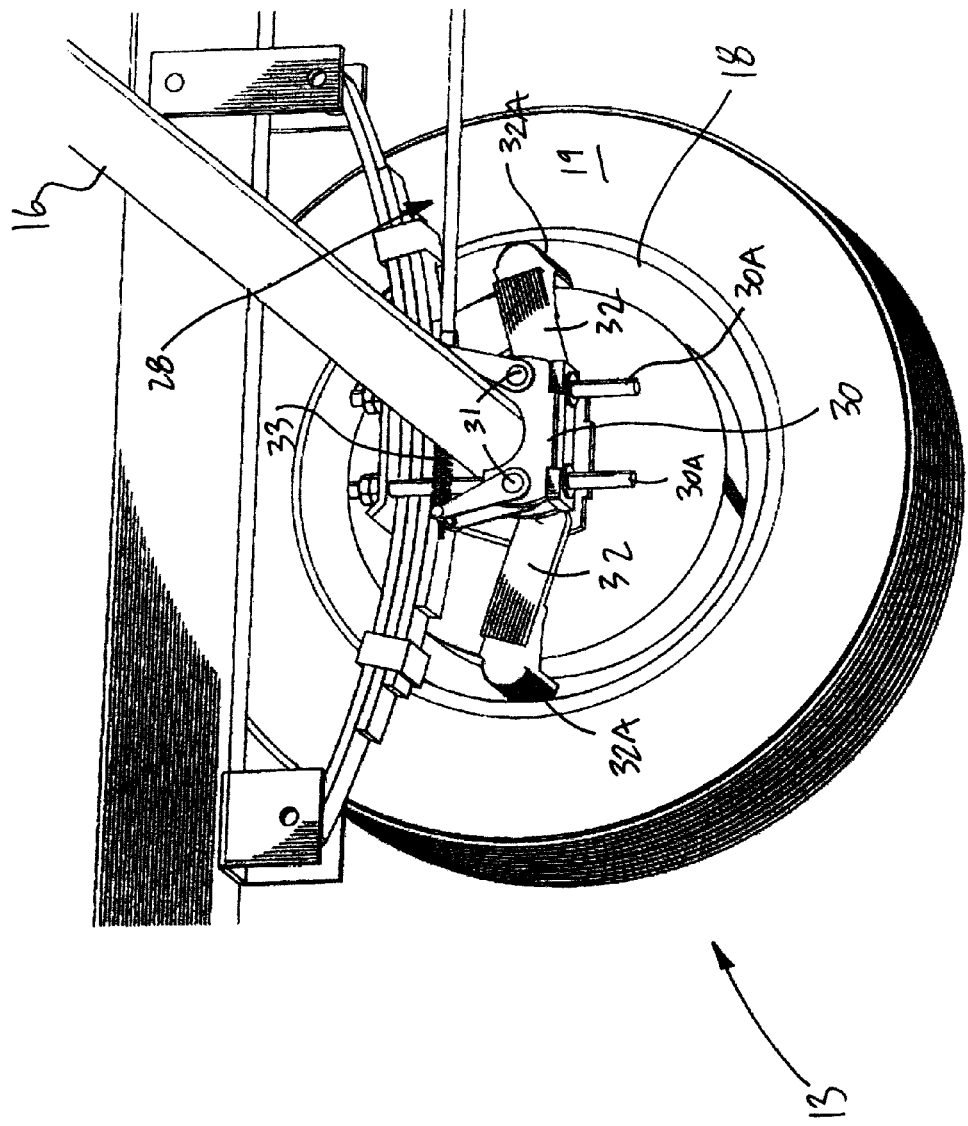
FIG. 5 is a perspective view of a braking end of the safety brake system in accordance with an embodiment of the present application, in the hitched state.

Referring to FIG. 1, both the hitch coupler 11 and the actuation end 12 are mounted to a tongue 14 of the trailer. It is well known that the tongue 14 is the interface between the trailer 10 and the vehicle towing the trailer 10. The hitch coupler 11 engages with a hitch 15 on the vehicle (e.g., ball hitch, fifth wheel loop or any other kind of hitch). As seen in FIG. 5, the brake end 13 of the safety brake system is mounted to the axle 16 of the trailer 10, so as to act on the rims 18 of the wheels 19 of the trailer 10.

Referring to FIG. 1, the actuation end 12 of the safety brake system is shown mounted to the trailer 10 but may alternatively be mounted to the vehicle or hitch of the vehicle. Accordingly, the actuation end 12 has a tongue mount 20 in the embodiment of FIG. 1. The tongue mount 20 is releasably or permanently secured to the tongue 14. For instance, the tongue mount 20 has an L-channel section secured to the tongue 14. Any other configuration is considered such as a support plate and a pair of U-shaped connectors, with the U-shaped connectors strapping the support plate to the tongue 14, by way of nuts or other appropriate fasteners.

The tongue mount 20 has a pivot 21, pivotally supporting a lever 22 (i.e., handle). A probe 23 is slidingly mounted to the tongue mount 20, so as to translate along direction A, for instance using guide channels and followers (such as bolts), or any other appropriate translational joint. A link 24 is integral with the probe 23, and is engaged to the lever 22 by a pin-and-groove joint 25 (FIG. 3), such that a pivoting motion of the lever 22 is converted to a translation of the probe 23. Any other type of joint may be used, such as a pivot joint with rack and pinion, or the like. The actuation end 12 may be operated without the lever 22.

Figure 2:
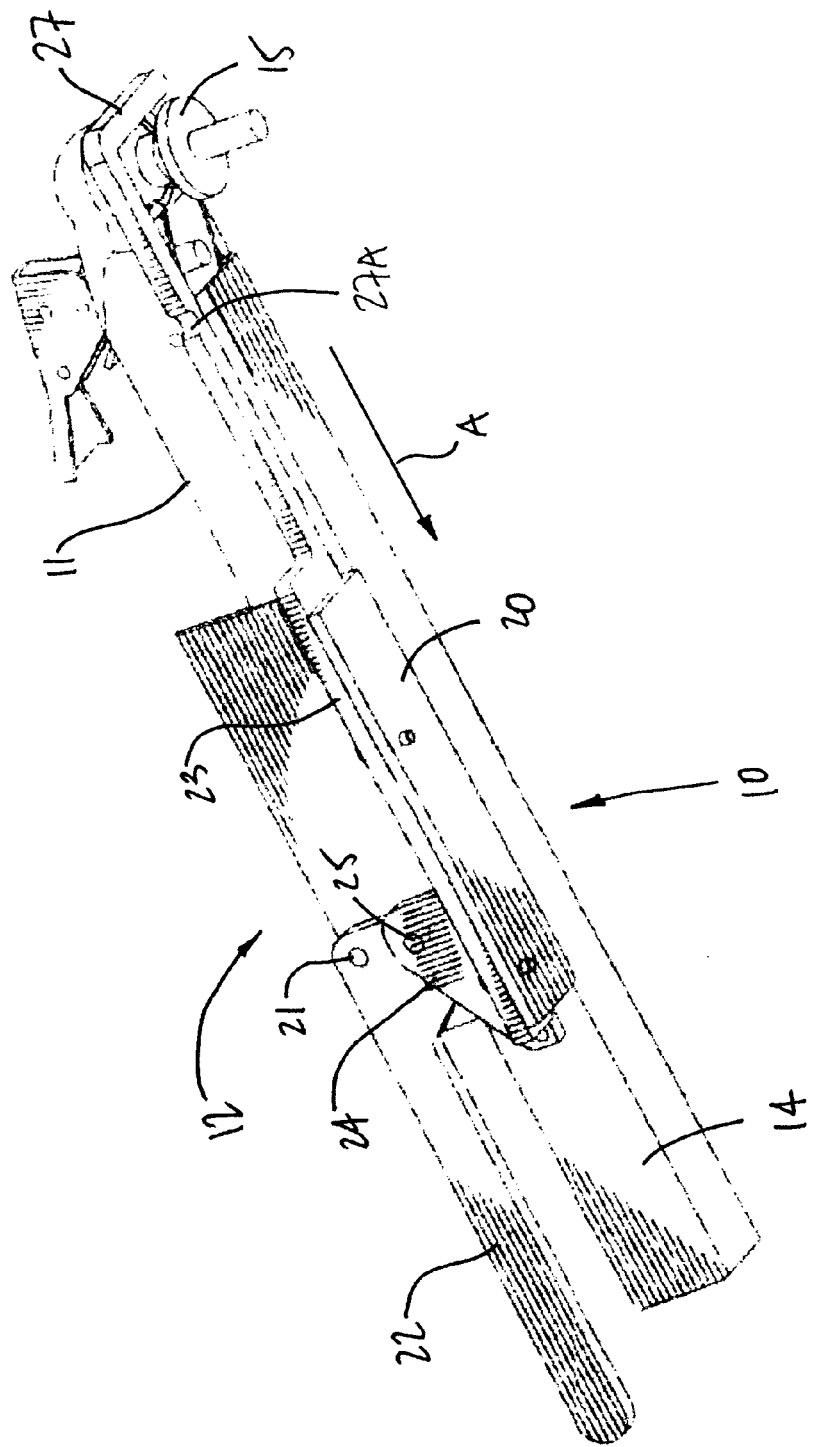
FIG. 2 is a bottom perspective of the actuation end of FIG. 1.
Figure 3:
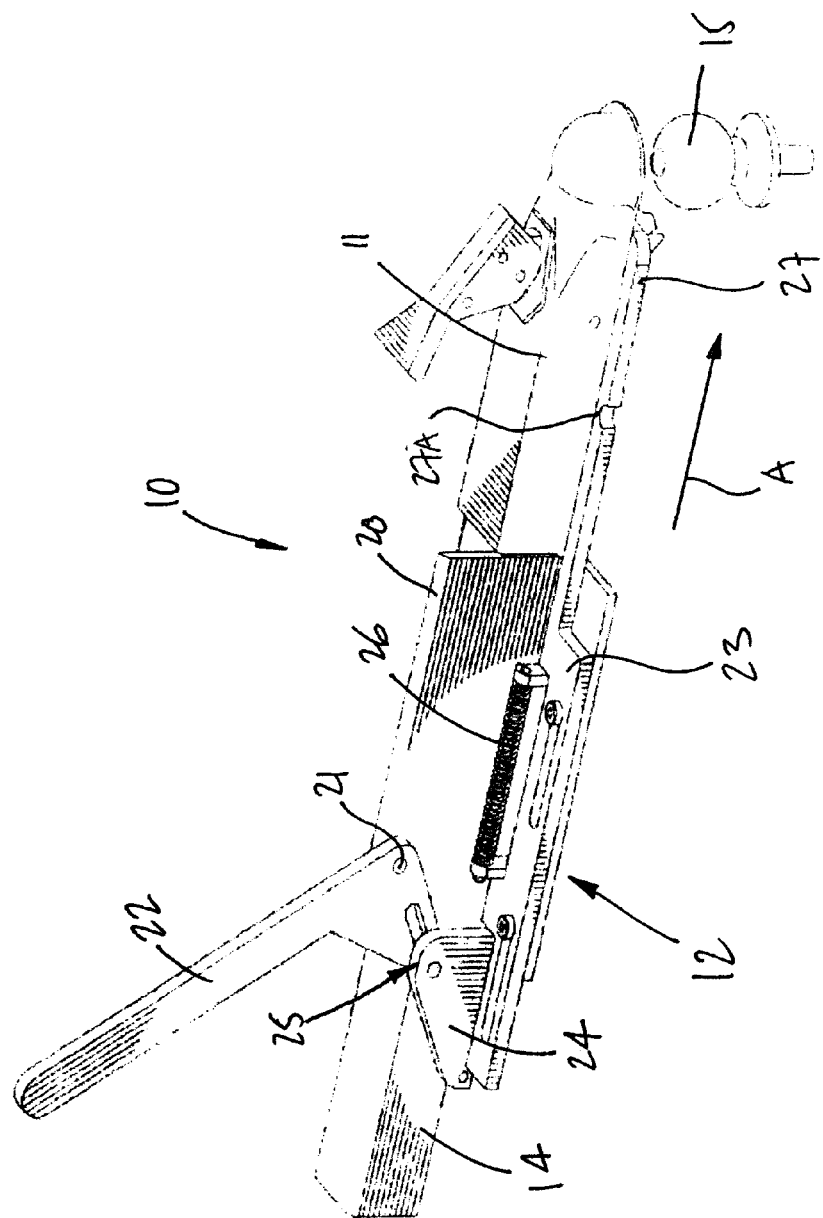
FIG. 3 is a top perspective view of the actuation end of FIG. 1, in a braking state.
Figure 4:
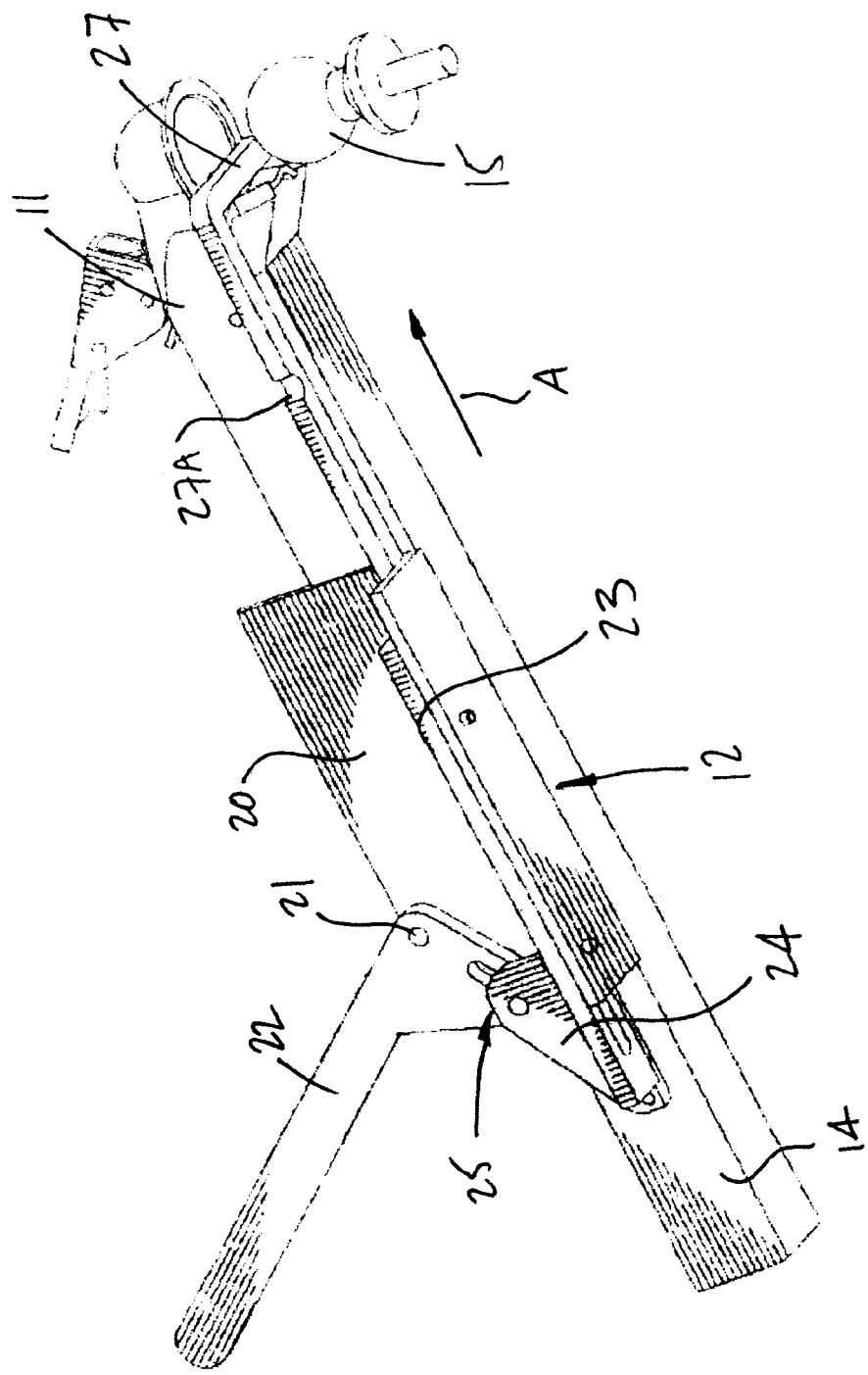
FIG. 4 is a bottom perspective of the actuation end of FIG. 3.

The probe 23 is positioned adjacent to the hitch coupler 11 so as to be aligned with the hitch 15 of the vehicle (e.g., tow ball, etc.). More specifically, the lever 22 is biased with an appropriate spring 26 (or any other suitable biasing unit) such that a probe end 27 of the probe 23 comes into contact with the hitch of the vehicle when the trailer 10 is hitched to the vehicle. In FIGS. 1 and 2, the probe 23 is illustrated as being in contact with the hitch 15, in a hitched state of the safety brake system. In that state, the probe end 27 abuts against the hitch of the vehicle, whereby it is retained from reaching the end position of FIGS. 3 and 4. The end position of FIGS. 3 and 4 is the braking state of the safety brake system. The spring 26 is supported by a rod passing therethrough for ensuring the directed resilient action of the spring 26.

A point of weakness 27A may be defined in the arm of the probe end 27. The point of weakness 27A is provided to ensure that the arm of the probe end 27 deforms in a given direction if submitted to an unexpected deforming force. The probe end 27 would not get tangled up in the hitch coupler 11 with this anticipated deformation, and would not impede the movement of the probe to the braking state.

A cable 28 interrelates the probe 23 to the brake end 13. The cable 28 transmits movements of the probe 23 to the brake of the brake end 13. In an embodiment, the cable 28 is of the type used in bicycle brakes, featuring a housing 28A accommodating a metallic wire 28B, with the metallic wire 28B moving axially into the housing 28A. As is seen in FIG. 1, the housing 28A is connected to the tongue 14, whereas the metallic wire 28B is connected to the link 24 or to any other part of the probe 23.

According to another embodiment, the actuation end 12 is connected to the brake end 13 by electrical wires. The movement of the probe 23 to the braking state is used to trigger a limit switch that sends a signal to the brake unit of the brake end 13. The brake unit may be electrically powered, or the electrical signal from the limit switch may be converted to mechanical, hydraulic, pneumatic forces to actuate the brake unit.

Figure 6:
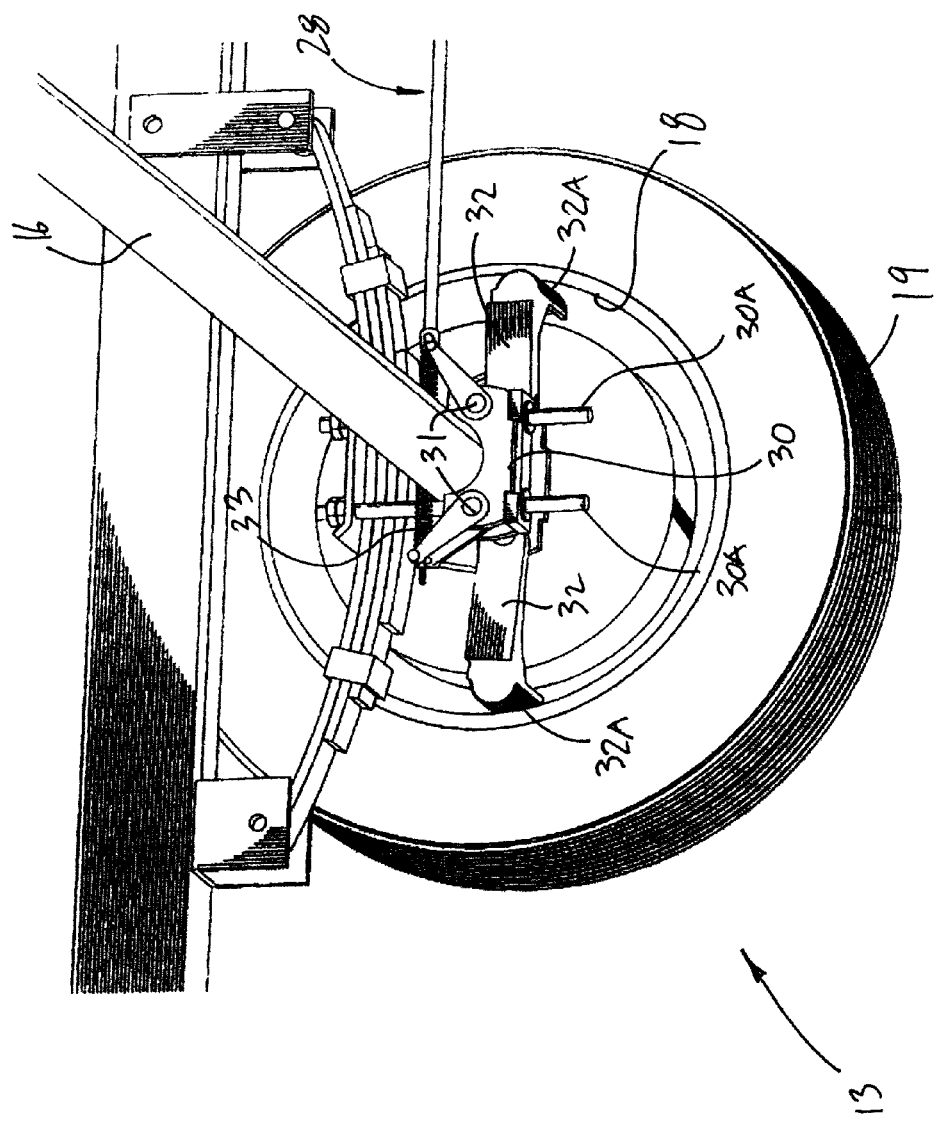
FIG. 6 is another perspective view of the braking end of FIG. 5, in the braking state.
Figure 7:
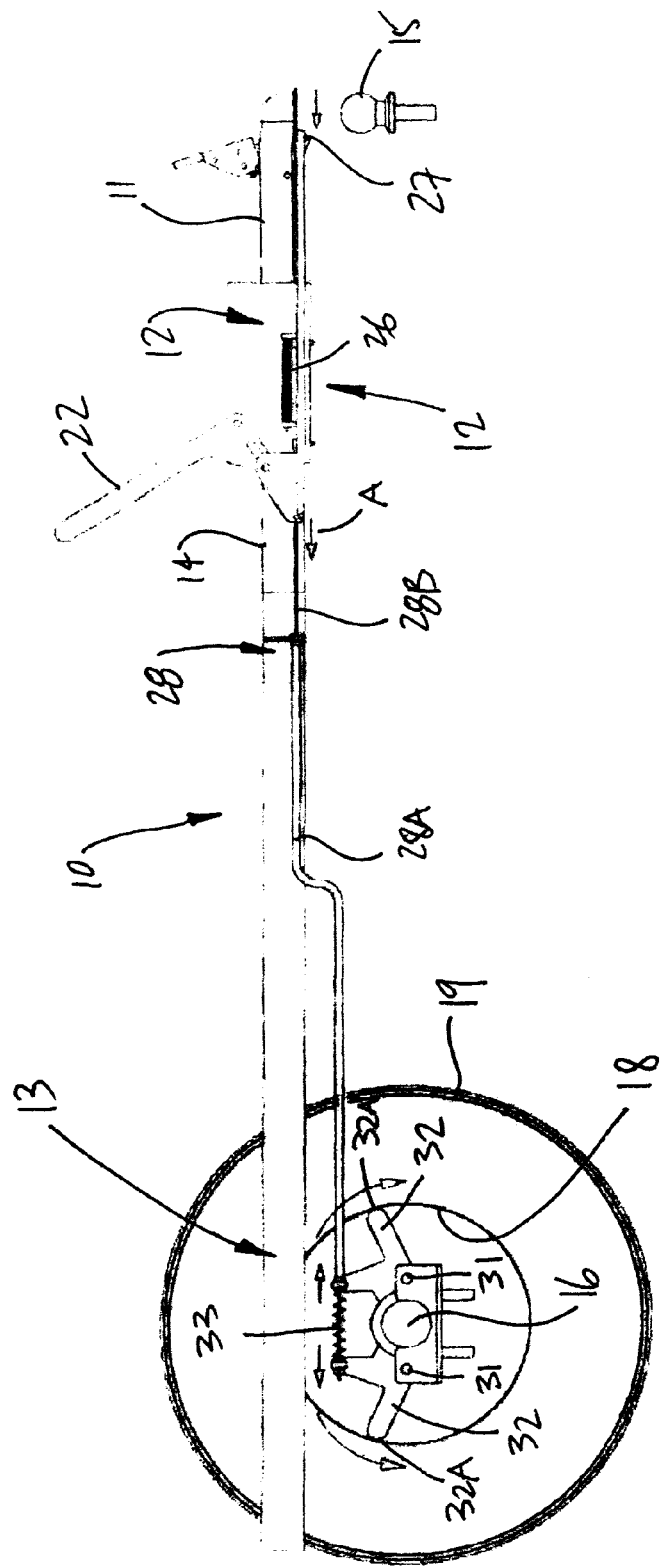
FIG. 7 is a schematic view of the safety brake system in the braking state.
Figure 8:
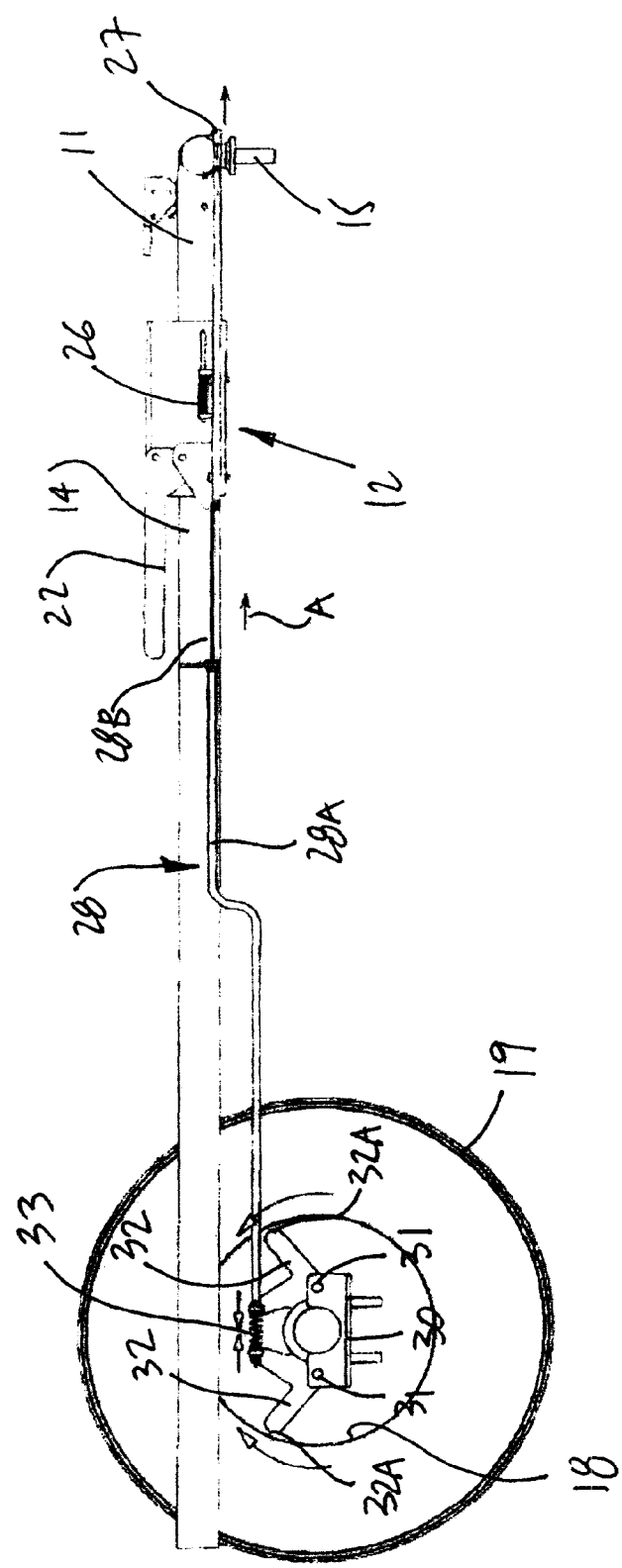
FIG. 8 is a schematic view of the safety brake system in the hitched state.

Referring to FIGS. 5 and 6, the brake end 13 has an axle mount 30 that is connected to the axle 16 so as to operatively position the brake end 13 opposite the wheel 19. In an embodiment, the axle mount 30 has a base placed against the axle 16, and secured thereto by bolts 30A. Alternatively, the axle mount 30 may have a support plate and U-shaped connectors, with the U-shaped connectors strapping the axle mount 30 to the axle 16, for instance with fasteners such as nuts or the like.

The axle mount 30 has pivots 31. A pair of arms 32 are pivotally connected to the support plate of the axle mount 30 by the pivots 31. The arms 32 have braking surfaces 32A that are adapted to contact the interior of the rim 18 of the wheel 19 in a braking action of the brake system.

A spring 33 is placed between the arms 32 away from the braking surfaces 32A, and biases the arms 32 away from one another. Accordingly, the spring 33 biases the arms 32 toward a pressing position against the rim 18. The contact between the braking surfaces 32A and the rim 18 will cause braking friction acting against any rotation of the wheels 19. According to an embodiment, the arms 32 of a same wheel act separately, with one arm 32 for a clockwise rotation, and another arm 32 for a counterclockwise rotation. In FIGS. 5 and 6, the right-hand side arm 32 blocks the wheel 19 rotating clockwise, while the left-hand side arm 32 blocks the wheel 19 rotating counterclockwise.

The position of the pivots 31 and the length of the arms 32 is such that the pivoting courses of the braking surfaces 32A are limited at one end by the rim 18. Therefore, when the safety brake system is in the braking state, the spring 33 will bring one of the arms 32 into contact with the rim 18. As the arm 32 rotates in the same direction as the rim 18, the rim 18 will draw the arm 32 therewith, thereby increasing the blocking action of the arm 32 on the rim 18. As the forces involved in braking are substantial, the components of the brake end 13 must be sized to operate under and sustain such forces.

In similar fashion to a bicycle brake system, the wire 28B of the cable 28 is connected to the arms 32. Accordingly, a release of the wire 28B from the actuation end 12 (FIG. 1) (i.e., loosening the tension in the wire 28B) will result in one of the braking surfaces 32A contacting the rim 18, by the action of the spring 33. The spring 26 biasing the lever 22 at the actuation end 12 provides additional force to that of the spring 33. This ensures that the brake system comes into contact with the wheel or wheels 19 when the trailer 10 is unhitched.

Therefore, the safety brake system operates in the following manner. When the trailer 10 is unhitched, the lever 22 is biased by the spring 26 such that the probe 23 moves into the space in which a vehicle hitch component would be, as shown in FIGS. 3 and 4. This results in tension loosening in the wire 28B, causing the arms 32 to move away form one another, and one of the braking surfaces 32A to come into contact with the rim 18. Alternatively, the movement of the probe 23 to the braking state (FIGS. 3 and 4) may actuate any existing braking system of the trailer 10 (e.g., hydraulic, electric, pneumatic, mechanical).

When the trailer 10 is hitched, the probe 23 moves to the position of FIGS. 1 and 2, thereby tightening the wire 28B. As a result, the braking surfaces 32A are separated from the rims 18, thereby unlocking the wheels 19.

Therefore, when the trailer 10 is unhitched, the brake system blocks the wheels. The lever 22 is used to manually actuate or release the brakes. For instance, the brakes are manually actuated when the unhitched trailer 10 must be displaced.

It is considered to provide a pair of brake ends 13 for a single one of the actuation end 12. Although not shown, each brake end 13 may be positioned on its own wheel 19, while the cables 28 are both actuated from the same actuation end 13.

It is considered to provide the safety brake system in a retrofit kit that can be used with existing trailers, or existing brake systems of trailers. The safety brake system described above is mounted to common components of a trailer 10. The safety brake system may adopt other configurations as a function of the trailers that will use it. For instance, the brake end 13 may be mounted to a suspension, or to the trailer frame, and may block other parts of the wheel. Similarly, the actuation end 12 is not restricted to being mounted to the tongue 14, and may be mounted on the vehicle as well.

It may be desired to keep the arms 32 locked in the braking position. For instance, when the trailer 10 is unhitched, it may be desired to block the wheels of the trailer 10. Accordingly, locking means, such as holes in the lever 22 and in the tongue 14 can be used with a lock, to prevent movement of the lever 22. The lock may be used to block the wheels with the arms 32, to prevent the trailer 10 from being hitched, and thus prevent theft. In such a case, the cable 28 is preferably concealed in the frame of the trailer to avoid tampering.

Figure 9:
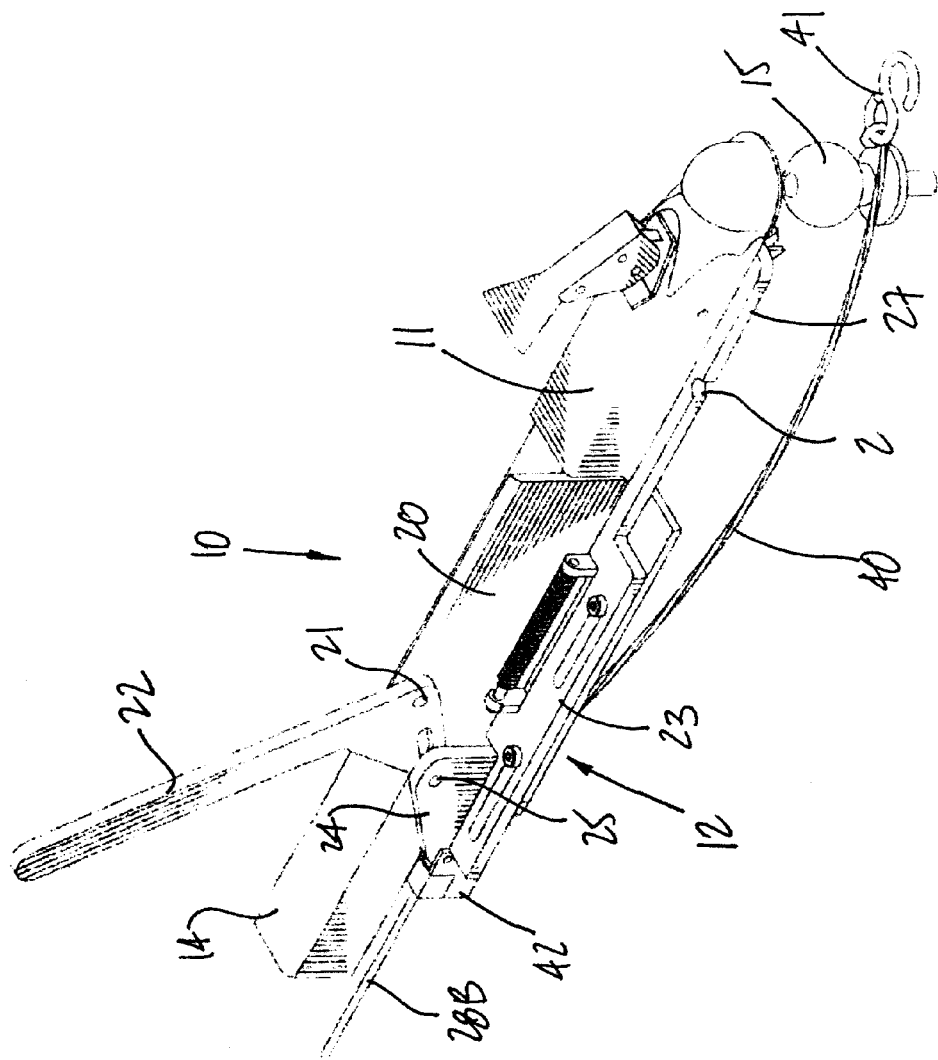
FIG. 9 is a top perspective view of an actuation end of a safety brake system with additional arming unit in accordance with an embodiment of the present application, in a braking state on a tongue of a trailer.
Figure 10:
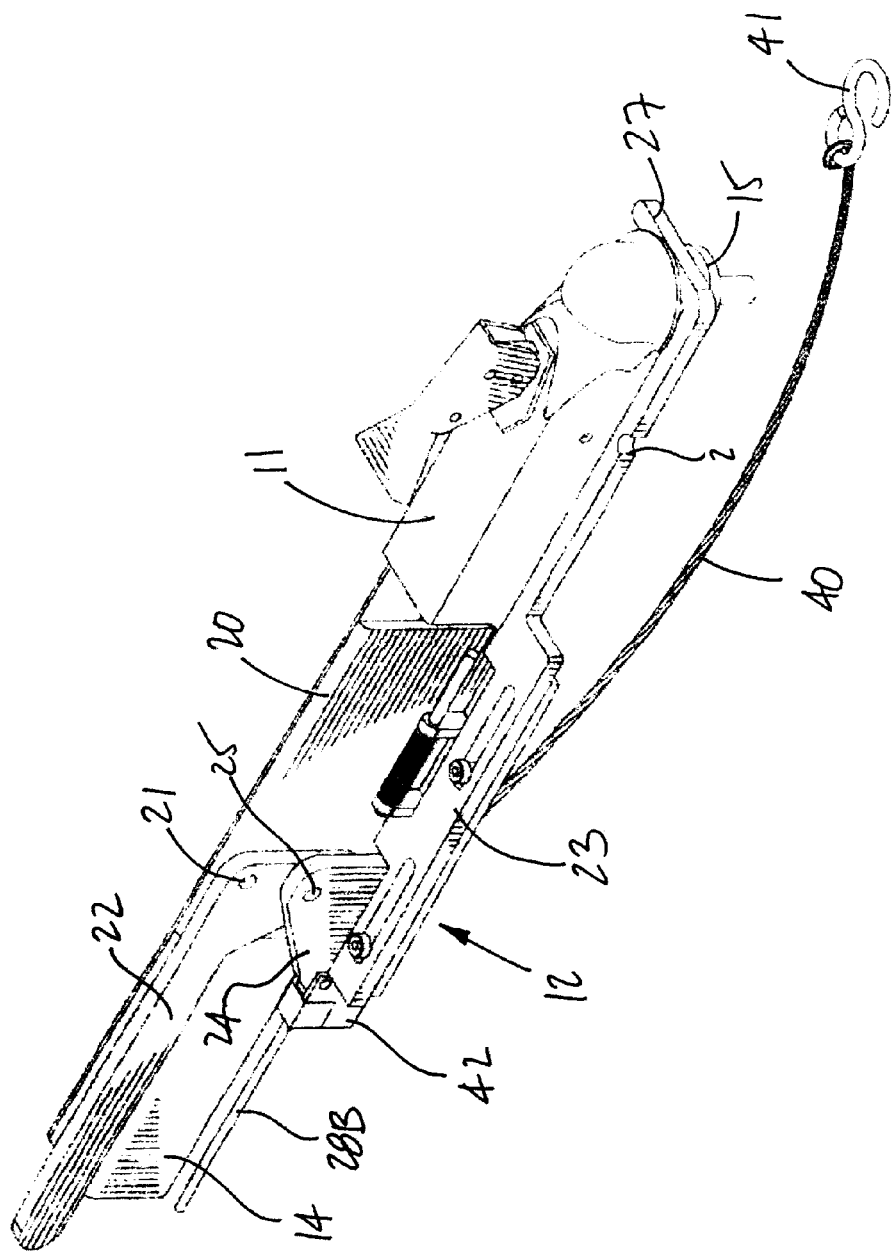
FIG. 10 is a top perspective view of the actuation end of the safety brake system of FIG. 9, in a hitched state.
Figure 11:
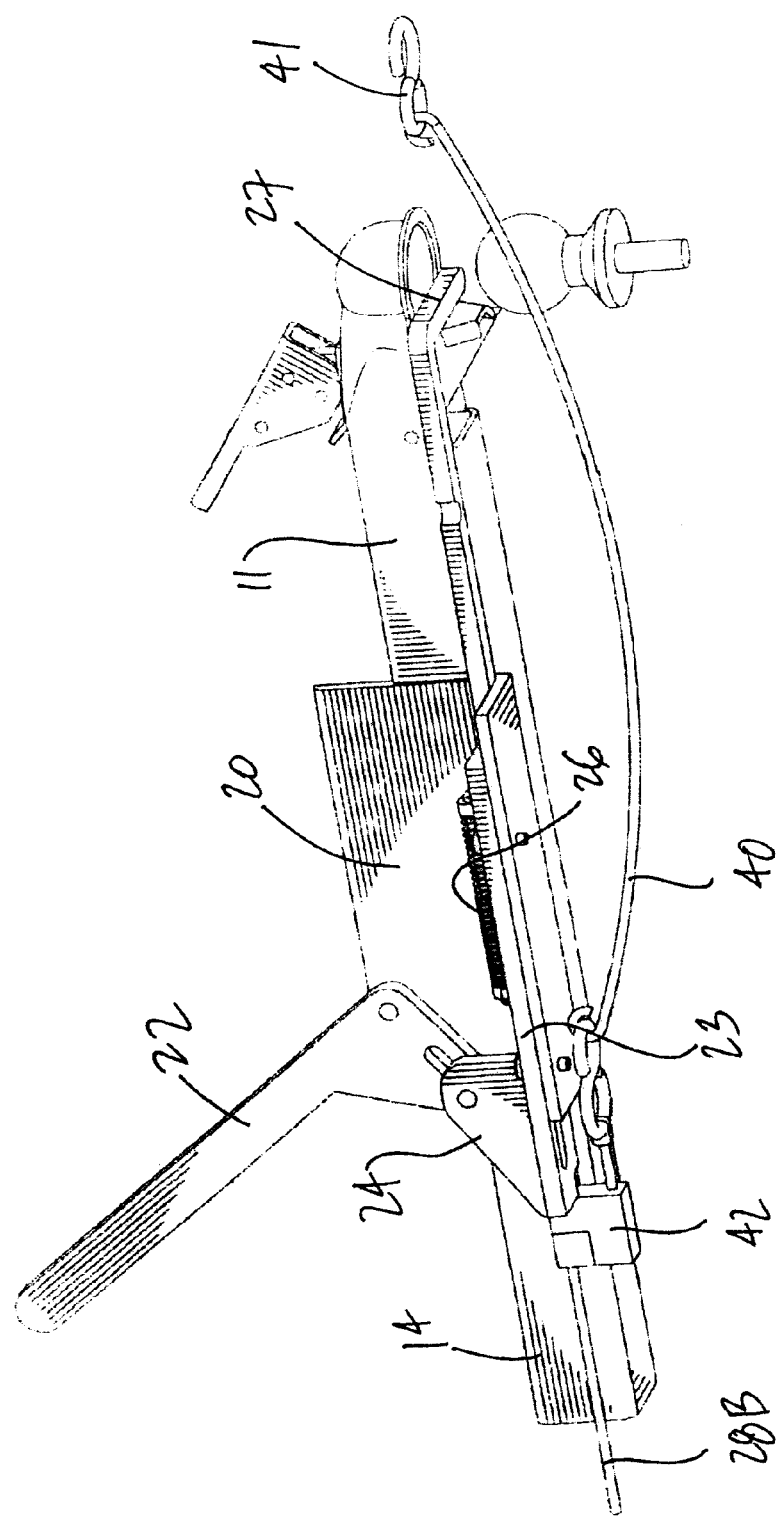
FIG. 11 is a bottom perspective view of the actuation system of FIG. 9 in the braking state.

Referring to FIGS. 9 and 10, it is also considered to provide an additional arming unit in case the trailer 10 detaches from the vehicle while still being hitched (e.g., break of the hitch). Such an additional arming unit may be a chain or cable 40 connected to the vehicle at a first end by a hook 41 or by any other suitable attachment, and to a junction between the probe 23/link 24 and the cable 28 at another end, by way of a breaking unit 42. If the cable 40 provides a pulling force above a given level on the breaking unit 42 (trailer 10 detaching from the vehicle), the breaking unit 42 breaks, thereby freeing the metallic wire 28B of the cable 28. This drop in tension in the cable 28 results in the spring 33 activating the arms 32 such that they come in contact with the rims 18. Every necessary precaution must be taken to provide a breaking unit 42 that will only break under substantial forces.

The safety brake system may be provided with any single one of the lever 22, the probe 23 or the additional arming unit (i.e., in case of a breakage of the hitch), or any combination thereof. For instance, the safety brake system may be provided with a manually actuated lever 22 only, or with any combination.

The probe 23 is illustrated in FIG. 1 for use with a standard ball hitch coupler 11. It is however considered to design a probe and/or actuation end for use with any other type of hitch system. For instance, the actuation end 12 may be designed for use with a fifth-wheel coupling system, or any other type of system.

In another embodiment, the safety brake system is designed to apply more braking power to one of the two wheels of the trailer 10. For instance, more braking power may be applied to the right-hand wheel of the trailer 10, to cause a right-hand path of movement to the trailer 10. It is known that in most countries the shoulder is on the right side of the road, whereby the right-hand path would safety direct the trailer 10 to the shoulder, as opposed to the opposing lane of incoming vehicles. Alternatively, the braking power may be greater on the left-hand wheel for countries in which the shoulder is on the left-hand side of the road. In order to provide more braking power on one of the wheels, the clearance between the braking surfaces 32A and the rim 18 are smaller for one of the two rims 18.

The invention claimed is:

1. A safety brake system for a trailer comprising:
a brake end comprising a brake unit adapted to be secured to a trailer and positioned to block at least one wheel of the trailer when actuated;
an actuation end comprising:
   a mount adapted to be secured to a front end of the trailer;
   a probe operatively supported by the mount for displacement with respect to the trailer, and a mechanism directly connecting the probe to the brake unit for transmission of movements from the probe to the brake unit, the probe being displaceable between a hitching state in which the probe is adapted to contact a hitch of a vehicle, and a braking state in which the probe actuates the brake unit;
a biasing unit to bias the probe against the hitch of the vehicle in the hitching state and toward the braking state in the absence of the hitch to retain the probe in the hitching state, such that the brake unit is automatically actuated when the hitch is separated from the trailer, by automatic biased displacement of the probe to the braking state resulting in automatic transmission of movement of the mechanism to the brake unit to actuate the brake unit.

2. The safety brake system according to claim 1, further comprising a lever connected to the probe to manually displace the probe between the hitching state and the braking state.

3. The safety brake system according to claim 2, wherein the lever is connected to the mount by a pivot connection.

4. The safety brake system according to claim 3, wherein the lever is connected to the probe by a pin-and-groove joint.

5. The safety brake system according to claim 2, comprising a lock unit releasably secured at least one of the probe and the lever to lock the brake unit in the braking state.

6. The safety brake system according to claim 1, comprising a translational joint between the probe and mount for the probe to move in translation along the mount.

7. The safety brake system according to claim 6, wherein the probe has a main body operatively supported on the mount rearward of the hitch coupler, and a probe end having a L-shape and having a portion positioned forward of the hitch coupler, with a movement from the hitching state to the braking state being in a rearward direction.

8. The safety brake system according to claim 7, further comprising a point of weakness in the probe end for selected deformation of the probe end.

9. The safety brake system according to claim 1, wherein the biasing unit is a spring connected between the probe and the mount.

10. The safety brake system according to claim 1, further comprising a cable unit having a housing and wire, the wire axially displaceable in the housing, with the cable unit connected to the probe at a first end and to the brake unit at another end to transmit actuation of the actuation end to the brake end.

11. The safety brake system according to claim 1, wherein the brake unit has a brake mount per wheel adapted to be connected to the trailer, and at least one arm pivotally connected to the brake mount, to pivot to a braking contact with a rim of the wheel.

12. The safety brake system according to claim 11, wherein the brake mount has two of said arms per wheel, with the two arms respectively providing braking contact to the rim for an own direction of rotation of the wheel.

13. The safety brake system according to claim 12, wherein the arms are biased away from one another by a spring.

14. The safety brake system according to claim 11, wherein the brake mount is adapted to be mounted to an axle of the trailer.

15. The safety brake system according to claim 10, further comprising a breakable unit connecting the wire to the probe, and a link between the breakable unit and the vehicle to break the breakable unit by transmitting a separation force when the trailer is inadvertently detached from the vehicle with the hitch remains coupled to the hitch coupler, to actuate the brake unit through the wire.

\* \* \* \* \*